United States Patent
Mutnuru

(10) Patent No.: US 11,657,020 B2
(45) Date of Patent: May 23, 2023

(54) METHOD AND APPARATUS FOR VERSIONING CLOUD NETWORK CONFIGURATION

(71) Applicant: Oracle International Corporation, Redwood Shores, CA (US)

(72) Inventor: Rishi Kaundinya Mutnuru, San Jose, CA (US)

(73) Assignee: Oracle International Corporation, Redwood City, CA (US)

( * ) Notice: Subject to any disclaimer, the term of this patent is extended or adjusted under 35 U.S.C. 154(b) by 32 days.

(21) Appl. No.: 17/143,062

(22) Filed: Jan. 6, 2021

(65) Prior Publication Data

US 2022/0214998 A1 Jul. 7, 2022

(51) Int. Cl.
 G06F 16/11 (2019.01)
 G06F 16/174 (2019.01)
 G06F 16/27 (2019.01)
 G06F 8/65 (2018.01)

(52) U.S. Cl.
 CPC .............. *G06F 16/128* (2019.01); *G06F 8/65* (2013.01); *G06F 16/174* (2019.01); *G06F 16/27* (2019.01);
(Continued)

(58) Field of Classification Search
 CPC ...... G06F 16/27; G06F 16/128; G06F 16/174; G06F 8/65; G06F 2201/80; G06F 2201/84
(Continued)

(56) References Cited

U.S. PATENT DOCUMENTS 10,038,593 B2 7/2018 Wang et al.
10,374,886 B1 * 8/2019 A .............................. H04L 41/12
(Continued)

FOREIGN PATENT DOCUMENTS

WO 2005006654 1/2005

OTHER PUBLICATIONS

"How to create and configure an automate patch deployment task? Automate Patch Deployment Task", ManageEngine Patch Manager Plus, Available Online at https://www.manageengine.com/patch-management/help/automate-patch-deployment-task.html, Accessed from Internet on: Sep. 28, 2020, 6 pages.
(Continued)

*Primary Examiner* — Robert W Beausoliel, Jr.
*Assistant Examiner* — Arthur Ganger
(74) *Attorney, Agent, or Firm* — Kilpatrick, Townsend & Stockton LLP

(57) ABSTRACT

The present disclosure relates to a method and/or apparatus for versioning cloud network configuration. The method can include receiving base configuration files for a set of devices forming at least a portion of a computing network, pulling current configuration files from each device of the set of devices, for each device, and determining a discrepancy when a base configuration file of the device and a current configuration file of the device do not match. When the discrepancy is determined for a device, generating a patch file based on the determined discrepancy for that device. The method can include extracting a last configuration commit time from that device, allocating a unique snapshot identifier to the patch file and associated with the last configuration commit time, and populating a snapshot database.

20 Claims, 10 Drawing Sheets

(52) U.S. Cl.
CPC ...... *G06F 2201/80* (2013.01); *G06F 2201/84* (2013.01)

(58) Field of Classification Search
USPC .......................................................... 707/639
See application file for complete search history.

(56) References Cited

U.S. PATENT DOCUMENTS

| | | | |
|---|---|---|---|
| 10,693,753 B2 | 6/2020 | Spirt et al. | |
| 2009/0216867 A1* | 8/2009 | Pusateri | H04L 41/085 709/222 |

OTHER PUBLICATIONS

"Generating a Network Snapshot", SerioSoft, Available Online at https://www.seriosoft.com/plus/seriohelp/generating_a_network_snapshot.htm, Accessed from Internet on Sep. 28, 2020, 3 pages.

"Mellanox NEO® Documentation", nVIDIA, MellanoxDocs, Mellanox NEO v2.5.1, Available Online at https://docs.mellanox.com/pages/viewpage.action?pageId=19807883, Sep. 25, 2020, 343 pages.

"Network Monitoring software—Monitor Nework Performance", Progress®Whatsup®Gold, Available Online at https://www/whatsupgold.com/network-monitoring-software, Accessed from Internet on Sep. 25, 2020. 11 pages.

"Patch Management Architecture", ManageEngine Patch Manager Plus, Available Online at https://www.manageengine.com/patch-management/help/patch-management-architecture.html, Accessed from Internet on: Sep. 28, 2020, 4 pages.

"Test Approve Patches", ManageEngine Patch Manager Plus, Available Online at https://www.manageengine.com/patch-management/help/test-approve-patches.html, Accessed from Internet on: Sep. 28, 2020, 7 pages.

"What is a Network Snapshot?", Available Online at https://www.seriosoft.com/plus/seriohelp/what_is_a_network_snapshot.htm, Accessed from Internet on Sep. 28, 2020, 1 page.

* cited by examiner

METHOD AND APPARATUS FOR VERSIONING CLOUD NETWORK CONFIGURATION

TECHNICAL FIELD

The present disclosure relates generally to networking, and more particularly to techniques for setting up and managing networks, such as CLOS networks, for a cloud services provider.

BACKGROUND

Data centers play an important role in modern software technology. Data centers frequently employ multiple servers connected interconnected via a switch architecture. Via this switch architecture, the servers are able to communicate with each other, as well as communicate with devices outside of the data center.

Such switch architectures have evolved and improved over time. Some of these improvements have included a change in architecture from tree architectures to more modern, spine-and-leaf architectures. These modern architectures provide significant benefits, including decreased and consistent latency.

These improvements in data center architecture have been driven, in part, by ever increasing needs for processing capability and increased processing speeds. Increasing processing demands have resulted in the growth of data centers, and specifically in the growth in the number of servers a switches forming the data center. Due to this growth, further improvements to the creation, control, and operation of data centers are desired.

BRIEF SUMMARY

The present disclosure relates generally to a method and/or apparatus for versioning cloud network configuration. the method can include receiving, with a poller daemon, base configuration files for a set of devices forming at least a portion of a computing network, pulling, with the poller daemon, current configuration files from each device of the set of devices forming the at least the portion of the computing network, for one, some, or each device, determining with the poller daemon, a discrepancy when a base configuration file of the device and a current configuration file of the device do not match, when the discrepancy is determined for a device, and generating with the poller daemon a patch file based on the determined discrepancy for that device. The method can include extracting with the poller daemon a last configuration commit time from that device, allocating with the poller daemon a unique snapshot identifier to the patch file and associated with the last configuration commit time; and populating a snapshot database. In some embodiments, the snapshot database can be populated with the unique snapshot identifier, a timestamp corresponding to the last configuration commit time for the device, a state of the device, a location of the base configuration file for the device, and a location of the patch file for the device. In some embodiments, the last configuration commit time of a device identifies a most recent update to a configuration of that device.

In some embodiments, the method further includes receiving a device inventory from an inventory database. In some embodiments, the device inventory identifies the set of devices forming at least the portion of the computing network. In some embodiments, the method includes generating a time sorted list of patch files according to the last configuration commit time associated with each of the patch files. In some embodiments, the unique snapshot identifier is allocated according to the time sorted list of patch files. In some embodiments, determining a discrepancy for the device includes comparing the base configuration file and the current configuration file.

In some embodiments, the method includes launching a flight check process, and determining a state of the computing network. In some embodiments, determining the state of the computing network can include: determining the state of each device of the set of devices, and determining the state of the set of devices in aggregate. In some embodiments, the state of each device populated in the snapshot database is the determined state of that device. In some embodiments, the method can include triggering an alarm if it is determined that the state of the set of devices in aggregate is failed.

In some embodiments, the method includes receiving a configuration deployment request, and suspending action by the poller daemon. In some embodiments, receiving the configuration deployment request can include receiving at least one new configuration file for at least one device in the set of devices forming at least the portion of the computing network. In some embodiments, the method can include determining to incorporate any available patch files for the at least one device into the at least one new configuration file.

In some embodiments, the method includes identifying a patch file for the at least one device, forming a merge output file for the at least one device, and applying the merge output file to the at least one device in the set of devices forming at least the portion of the computing network. In some embodiments, the merge output file is generated via attempting to merge the identified patch file and the at least one new configuration file. In some embodiments, the merge output file includes the at least one new configuration file and the identified patch file for the at least one device when attempting to merge the identified patch file and the at least one new configuration file is successful.

In some embodiments, the method can include disassociating the patch file from the configuration file when attempting to merge the identified patch file and the at least one new configuration file is unsuccessful. In some embodiments, the method can include associating a new snapshot identifier with the merge output file upon successful application of the merge output file to the at least one device, and updating the snapshot database with the new snapshot identifier and a location for the merge output file.

One aspect of the present disclosure relates to a non-transitory computer-readable storage medium storing a plurality of instructions executable by one or more processors. In some embodiments, the plurality of instructions when executed by the one or more processors cause the one or more processors to receive base configuration files for a set of devices forming at least a portion of a computing network, pull current configuration files from each device of the set of devices forming the at least the portion of the computing network, for each device, determine a discrepancy when a base configuration file of the device and a current configuration file of the device do not match, when the discrepancy is determined for a device, generate a patch file based on the determined discrepancy for that device, extract a last configuration commit time from that device, the last configuration commit time identifying a most recent update to a configuration of that device, allocate a unique snapshot identifier to the patch file and associated with the last configuration commit time, and populate a snapshot database with the unique snapshot identifier, a timestamp corresponding to the last configuration commit time for the device, a state of the device, a location of the base configuration file for the device, and a location of the patch file for the device.

In some embodiments, the non-transitory computer-readable storage medium further storing a plurality of instructions executable by one or more processors, the plurality of instructions when executed by the one or more processors cause the one or more processors to further receive a configuration deployment request, suspend action by the poller daemon. In some embodiments, receiving the configuration deployment request can include receiving at least one new configuration file for at least one device in the set of devices forming at least the portion of the computing network.

One aspect of the present disclosure relates to a system. The system can include a memory including a snapshot database including information relating to a plurality of configurations. In some embodiments, each of the plurality of configurations can be associated with a snapshot identifier. The system can include a processor. The processor can receive base configuration files for a set of devices forming at least a portion of a computing network, pull current configuration files from each device of the set of devices forming the at least the portion of the computing network, for each device, determine a discrepancy when a base configuration file of the device and a current configuration file of the device do not match, when the discrepancy is determined for a device, generate a patch file based on the determined discrepancy for that device, extract a last configuration commit time from that device, the last configuration commit time identifying a most recent update to a configuration of that device, allocate a unique snapshot identifier to the patch file and associated with the last configuration commit time, and populate the snapshot database. In some embodiments, the snapshot database can be populated with the unique snapshot identifier, a timestamp corresponding to the last configuration commit time for the device, a state of the device, a location of the base configuration file for the device, and a location of the patch file for the device.

In some embodiments, the processor can further receive a configuration deployment request, determine to incorporate any available patch files for the at least one device into the at least one new configuration file, identify a patch file for the at least one device, form a merge output file for the at least one device, and apply the merge output file to the at least one device in the set of devices forming at least the portion of the computing network. In some embodiments, receiving the configuration deployment request can include receiving at least one new configuration file for at least one device in the set of devices forming at least the portion of the computing network.

Various embodiments are described herein, including methods, systems, non-transitory computer-readable storage media storing programs, code, or instructions executable by one or more processors, and the like.

The foregoing, together with other features and embodiments will become more apparent upon referring to the following specification, claims, and accompanying drawings.

DETAILED DESCRIPTION

Figure 1:
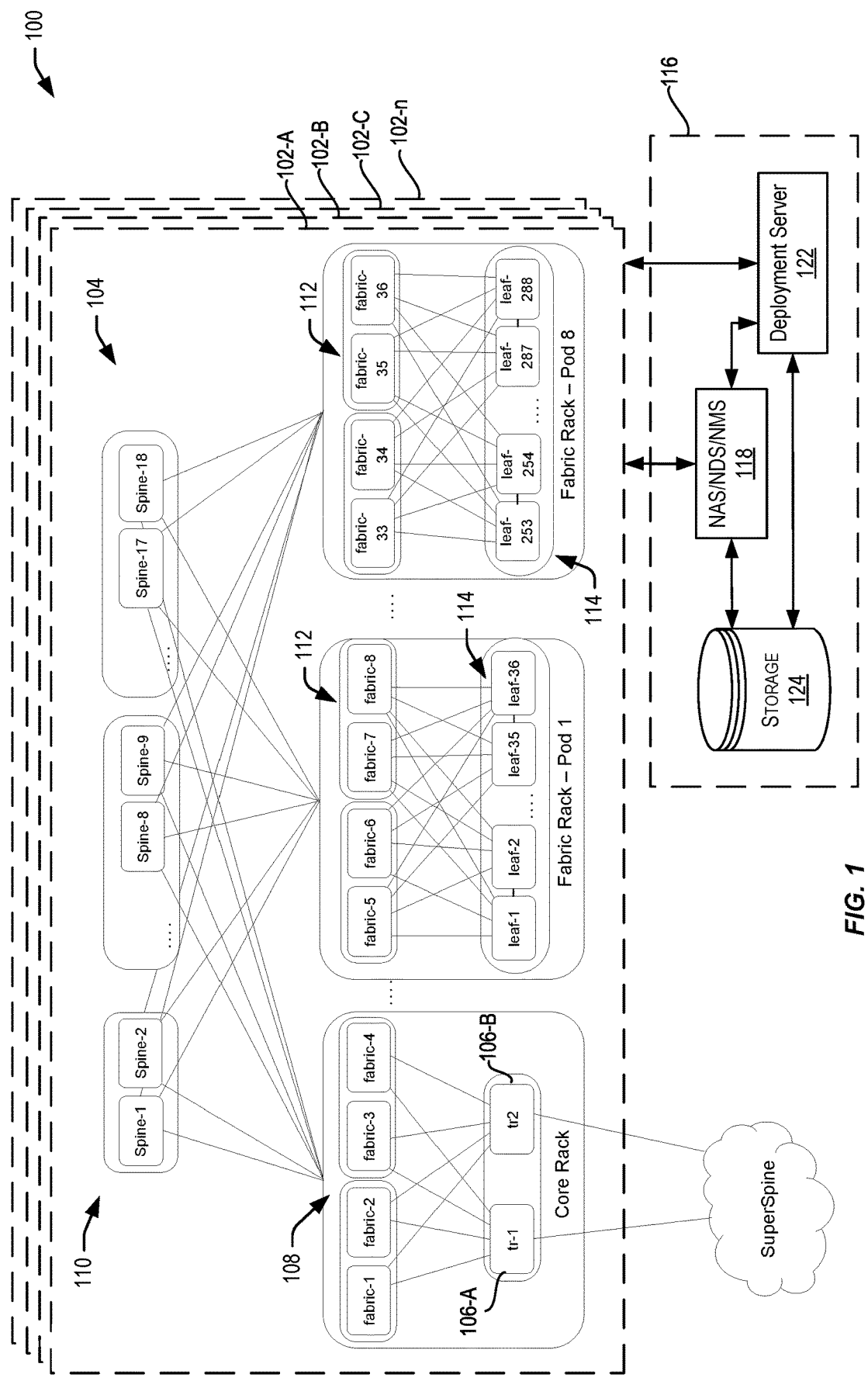
FIG. 1 depicts a simplified diagram of one embodiment of a network system.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

A cloud services provider (such as Oracle Corporation of Redwood Shores, Calif.) may provide one or more cloud services that can be subscribed to by customers (or subscribers) of the offered services. In order to provide these services, the cloud services provider may run thousands of applications in its cloud infrastructure. These thousands of applications may be executed by hundreds (or even more) of servers and the applications and servers need to communicate and exchange data with each other in the provision of the cloud services. As part of its cloud infrastructure, a cloud services provider thus has to build a robust and scalable network (or multiple networks) that are scalable and provide seamless experience to the subscribers for the applications. For example, it is desired that such a network support application ("app") continuity, application fluency, application optimization, and the like.

Such networks are generally quite complex with potentially hundreds, or thousands, or even more components. A typical cloud network for a cloud services provider comprises multiple routers and switches that are responsible for routing and handling of traffic between applications executed by servers within the infrastructure of the cloud services provider. The servers may be spread across one of more data centers. These applications may include applications that are accessed by subscribers (clients) of the cloud services.

CLOS (or Clos or CLoS) topology-based networks are currently commonly used by cloud service providers to implement their networks. A CLOS network is a multi-tiered network (e.g., 2-tiered, 3-tiered, etc.) comprising of multiple devices organized into tiers or layers. Each tier comprises one or more switches or routers. Switches, routers, and devices are used interchangeably herein in the context of the computing network. Thus, a "device" in the computing network can be a switch or router. A CLOS network specifies a hierarchy of devices connected to backend servers that may be executing the applications. Clos networks are popular because they offer deterministic or informed latency all the way from where the packet enters the network from a server to when it leaves the network. A Clos network also offers redundancy and high availability.

For example, a 2-tiered CLOS network comprises:
(1) An edge layer where network traffic enters and exits the CLOS network. The edge layer comprises leaf devices that may be connected to servers that execute the cloud applications. The edge layer provides an entry point for network traffic originating from servers connected to the leaf devices to enter the CLOS network. The edge layer also provides an exit point for network traffic to leave the CLOS network to intended destination servers. The edge layer thus includes an ingress stage comprising devices where the network traffic enters the CLOS network, and an egress stage comprising devices from which the network traffic exits the CLOS network and is communicated to destination servers.
(2) An aggregation layer connected to the edge layer devices. The aggregation layer comprises one or more spine devices. Spine devices may use Data Center Interconnect (DCI) technology that is used to connect two or more data centers together over short, medium or long distances using high-speed packet-optical connectivity. The aggregation layer provides connectivity between the ingress stage of the edge layer and the egress stage of the edge layer. An edge leaf device may be connected to one or more spine devices.

In a 2-tiered CLOS network, for communication between servers (e.g., between applications executed by the servers) in an AD, a packet originating from a source server (e.g., originating from an application executed by the source server) may be received by a leaf device (of the ingress stage) connected to the source server. The ingress stage leaf device may then forward the packet to an appropriate spine device, which in turn may forward the packet to an egress stage leaf device. The egress stage leaf device may then forward the packet to a server that is executing an application that is the intended destination of the packet.

A 3-tiered CLOS network may include:
(1) An edge layer as described above.
(2) An aggregation layer as described above.
(3) A fabric layer comprising fabric devices. A fabric layer generally sits between the edge layer and the aggregation layer (i.e., provides connectivity between leaf devices of the edge layer and the spine devices of the aggregation layer). In certain configurations, fabric devices may also be connected to one or more transit routers ("TR") that provide connectivity between availability domains. A leaf device may be connected to one or more fabric devices. The fabric layer increases the scalability of a CLOS network. For example, in a particular setup, leaf devices may have 10 Gig ports and fabric devices may have 40 Gig ports. In this setup, four leaf device ports or interfaces can be connected to one fabric device port. A fabric device may be connected to one or more spine devices.

In a 3-tiered CLOS network, for communication between servers (e.g., between applications executed by the servers) in an availability domain ("AD"), a packet originating from a source server (e.g., originating from an application executed by the source server) may be received by a leaf device (of the ingress stage) connected to the source server. The ingress stage leaf device may then forward the packet to an appropriate fabric device, which may in turn forward the packet to a spine device. The spine device may then forward the packet to a fabric device, which in turn forwards the packet to an egress stage leaf device. The egress stage leaf device may then forward the packet to a server that is executing an application that is the intended destination of the packet.

For example, a cloud services provider may have cloud infrastructure in a particular region (e.g., San Jose). The infrastructure may spread across multiple buildings and multiple floors of a building. Each building may represent an AD. Within a building, each floor of the building may host a subset of the cloud applications, and a floor may communicate with another floor using DCI spine devices. One building may talk to another building via a transit router (TR). Within an AD (i.e., within a building) a CLOS network may be set up and used for enabling communications and data exchanges between servers in that building.

The setting up and management of cloud networks (e.g., CLOS networks) is a difficult, tedious, and time consuming process because the setting up and management tasks are currently done manually. For each network, components of the network generally have to be individually configured and/or provisioned. For example, each leaf device has to be configured including allocating a host name to the leaf device that is recognizable by DNS (Domain Name Server) and DHCP (Dynamic Host Configuration Protocol) (e.g., hostname.oracle.com), specifying VLANs, IP addresses, VRFs (virtual routing and forwarding), interfaces, etc. The information stored and used by the DNS and DHCP servers also has to be updated for each device. As the size and scale of a cloud network increases or changes, network set-up and management become a big headache. For example, imagine having to configure and manage a network comprising thousands or even more of devices in a CLOS network. To further complicate matters, the individual devices, for example, the leaf devices can be from different vendors with each vendor having its own unique way of configuring its devices. A network administrator thus has to learn all these different ways of configuring devices for different vendors.

As described herein, techniques are described for automating the network configuration and management of a computing network such as a cloud network through a centralized location as well as the automated provisioning and/or configuration of devices within the computing network. The techniques include enabling the network to be defined using a network model. The model encapsulates information related to the network, such as the network topology (e.g., whether the network is a 2-tier, 3-tier, or n-tier network), network hierarchy, identification of components (e.g., various devices) of the network, characteristics/features and configurations for components of the network, and the like. This model can be ingested and used for the automatic creation and/or configuration of the computing network.

FIG. 1 is a schematic illustration of one embodiment of a network system 100. The network system 100 can comprise one or several computing networks 102. In some embodiments, these computing networks can be arranged into one or several units such as, for example, one or several realms, regions, availability domains, or the like. In some embodiments, an availability domain can comprise one or several computing networks 102. In some embodiments, the computing networks 102 can comprise a 3-tiered Clos network having a spine-and-leaf architecture as depicted in FIG. 1.

A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc.

A feature of a Clos network is that the maximum hop count to reach from one Tier-0 switch to another Tier-0 switch (or from an NVD connected to a Tier-0-switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

The computing network 102, also referred to herein as the physical network 120 includes transit routers 106-A, 106-B. The computing network 102 can include any desired number of transit routers 106 including, for example, 1 transit router 106, 2 transit routers 106, 3 transit routers 106, 4 transit routers 106, 5 transit routers 106, 10 transit routers 106, 20 transit routers 106, 50 transit routers 106, 100 transit routers 106, 200 transit routers 106, 500 transit routers 106, between 1 and 20 transit routers 106, between 20 and 100 transit routers 106, between 100 and 500 transit routers, and/or any other or intermediate number of transit routers 106. The transit routers 106 can be connected via first fabric devices 108 to spine devices 110, which spine devices 110 can be connected via second fabric device 112 to leaf devices 114.

In the embodiment depicted in FIG. 1, a set of "n" leaf devices 114 are connected and together form a pod. In some embodiments, this pod further includes a set of "n" second fabric devices 112 connected to the leaf devices. In some embodiments, each leaf device 114 is connected to each second fabric device 112 in a pod, however, there is no connectivity of devices between pods. In certain implementations, two pods are referred to as a block. Each block is served by or connected to a set of "n" spine devices 110, also referred to herein as Tier-2 switches or as spine switches. There can be several blocks in the physical network topology. The spine devices 110 are in turn connected to first fabric devices 108. Communication of packets over computing network 102 is typically performed using one or more Layer-3 communication protocols. Typically, all the layers of the physical network, except for the leaf devices 114 are n-ways redundant thus allowing for high availability. Policies may be specified for pods and blocks to control the visibility of switches to each other in the physical network so as to enable scaling of the physical network.

One or several computing networks 102 are connected with server 116. Server 116 can comprise one or several servers and can administer and/or manage the one or several computing networks 102. The server 116 can, as depicted in FIG. 1, include: Network Automation Server ("NAS")/Network Deployment Server ("NDS")/Network Management Server ("NMS") 118, also referred to herein as NAS 118, NDS 118, or NMS 118; deployment server 122; and/or storage 124, also referred to herein as topology database 124.

The NAS 118 can be a component, embodied in hardware or software, which can be communicatingly coupled to one or several of the computing networks 102. In some embodiments, the NAS 118 can be embodied as one or several computing devices and/or servers that are communicatingly coupled to one or several of the computing networks 102. In embodiments in which the NAS 118 is embodied in software, NAS 118 can be one or several applications. The NAS 118 can administer and/or control one or several aspects of operation and/or configuration of the one or several computing networks 102 and/or of one, some, or all of the devices in the one or several computing networks 102. In some embodiments, NAS 118 can provide network device provisioning, policy enforcement, security lock-down, software management, and compliance reporting. In some embodiments, the NAS 118 can manage and/or deploy independent components and/or devices within the one or several computing networks 102.

The deployment server 122 can be a component, embodied in hardware or software, which can be communicatingly coupled to one or several of the computing networks 102. In some embodiments, the deployment server 122 can be embodied as one or several computing devices and/or servers that are communicatingly coupled to one or several of the computing networks 102. In embodiments in which the deployment server 122 is embodied in software, deployment server 122 can be one or several applications. In some embodiments, the deployment server 122 can manage aspects of deployment of one or several configuration files and/or patches. This can include, for example, storing configuration files, maintaining one or several databases relating to the deployed configurations. In some embodiments, the deployment server 122 can further track the state of all or portions of the computing network, including, for example, the state of one or several devices in the computing network and/or the state of these one or several devices in aggregate. The deployment server 122 can further, in the event of a failure of the network and/or of portions of the network, roll back the failed network to a previous configuration, and/or roll back the one or several devices to previous configurations. In some embodiments, by tracking the state of the network and/or of devices in the network, and linking these states with configuration file, the deployment server 122 can facilitate easy and rapid roll back to functioning configurations in the event of a failure of the computing network and/or of one or several devices therein.

The network system 100 can include storage 124, which storage can be part of server 116 or can be separate from server 116. The storage can comprise memory, and specifically can comprise any desired type or form of memory. In some embodiments, the storage 124 can comprise one or several databases including, for example, an inventory database, a snapshot database, a configuration database, and/or a patch database.

In some embodiments, the inventory database can include information identifying some or all of the devices in the computing network 102. In some embodiments, for example, the inventory database can include information identifying all of the devices in the computing network 102, and the topology of these devices. The inventory database can include, for example, information identifying each device, such as, for example a device name, a device type, a device vendor, or the like. The inventory database can include, for example, information identifying, for each device: neighbors; interfaces; chassis state; and/or cluster mode. In some embodiments, the inventory database can include information identifying a topology of the computing network 102.

The snapshot database can include information relating to one or several snapshots of configuration and state of some or all of the devices in the computing network 102 at one or several moments in time. For example, a snapshot may include configuration information and state for the entire computing network 102 and/or for a subset of multiple devices of the computing network 102. In some embodiments, a snapshot may include configuration information and state for a single device in the computing network 102. This information can include, for example, a snapshot identifier, an identifier indicating whether the snapshot, and more specifically the configuration represented by the snapshot is active, a state, a vendor name, a model, a location of a base configuration of the device at the moment of the snapshot, a location of one or several patches running as part of the configuration of the device at the moment of the snapshot, and/or a timestamp identifying the moment of generation of the snapshot. One example information contained in a snapshot database is shown below.

and specifically from the configuration stores subsystem 202. The deployment subsystem 300 can store the generated configuration, which configuration can, in some embodiments, ultimately be pushed to the switches. In some embodiments, the deployment subsystem 300 can generate and/or maintain a database of the configuration for an entire computing network 102, which can, in some embodiments, be the entire computing network 102 of one or several ADs. In some embodiments, the deployment subsystem 300 can maintain a version, also referred to as a snapshot, of configuration of the computing network 102 and/or of one or several devices in the computing network 102. This can include, maintaining the snapshot database.

The poller daemon subsystem 302, also referred to herein as the poller daemon 302 can be embodied in hardware or software within the deployment server 122. The poller daemon 302 can periodically poll the devices in the computing network 102. Through this polling, the poller daemon 302 can determine if there have been any manual updates to any of the devices in the computing network 102. In the event that there has been an update, the poller daemon 302 can identify the update and generate a patch file of the update. The poller daemon 302 can further allocate a unique snapshot ID to the patch file.

| Snapshot ID | Active (Y or N) | Device Name | Vendor Name (e.g., Arista, Cisco, Juniper) | Model | Location of Base Configuration (Snapshot ID can be part of the location) | Location of any Patches | State (e.g., Ok, failed, N/A) | Snapshot Timestamp |
|---|---|---|---|---|---|---|---|---|

Figure 2:
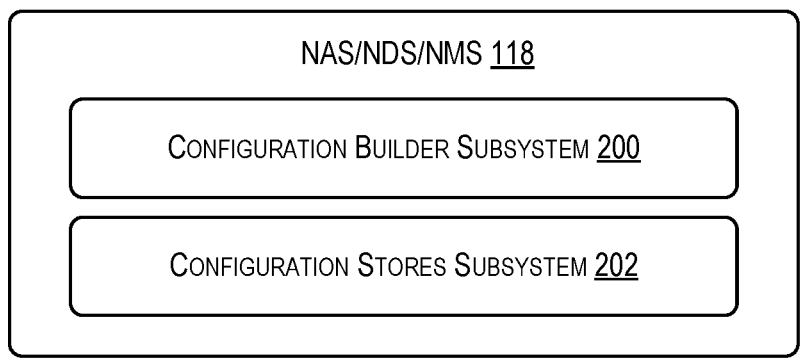
FIG. 2 is a functional schematic of one embodiment of a Network Automation Server.

FIG. 2 is a functional schematic of one embodiment of NAS 118. As seen in FIG. 2, the NAS 118 can include a configuration builder subsystem 200, and a configuration stores sub system 202.

The configuration builder subsystem 200 can be embodied in hardware or software within the NAS 118. The configuration builder subsystem 200 can build a configuration for the devices in the computing network. In some embodiments, these configurations can be created in a vendor agnostic manner.

The configuration stores subsystem 202 can be embodied in hardware or software within the NAS 118. The configuration stores subsystem 202 can deploy configurations. In some embodiments, the configuration stores subsystem 202 can deploy configuration as part of a ZTP process. In some embodiments, the configuration stores subsystem 202 can update the deployment server 122 with information regarding the configuration. This information can comprise a JSON payload, and can include information regarding the configuration for each switch. In some embodiments, this can include metadata regarding the configuration including, for example, the source of the configuration, the user generating the configuration, the size of the configuration, a hash of the configuration file such as, for example, the md5 hash of the configuration file, or the like.

Figure 3:
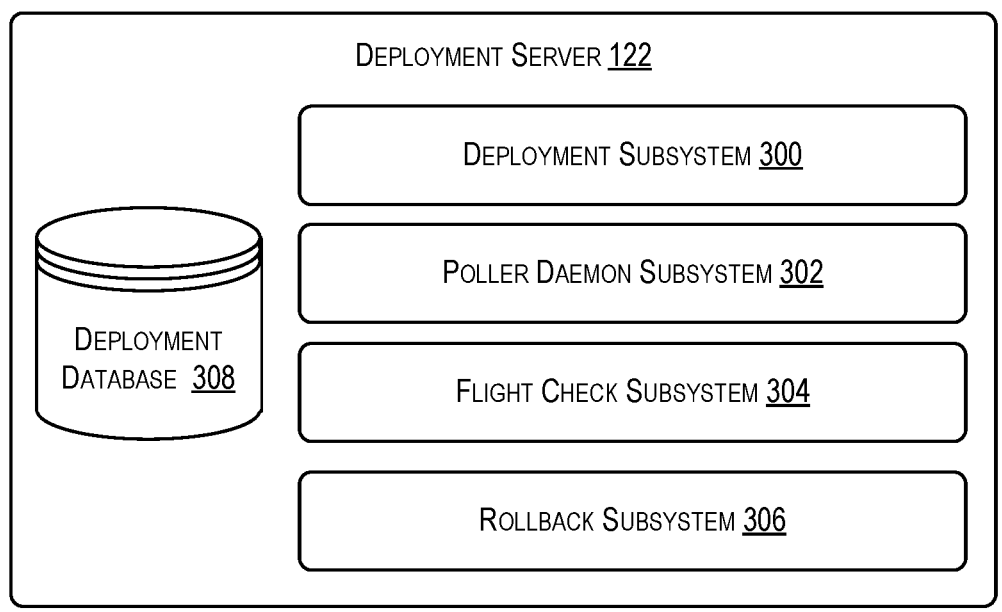
FIG. 3 is a functional schematic of one embodiment of deployment server.

FIG. 3 is a functional schematic of one embodiment of deployment server 122. The deployment server 122 can include a deployment subsystem 300, a poller daemon subsystem 302, a flight check subsystem 304, a rollback subsystem 306, and/or a deployment server database 308.

The deployment subsystem 300, also referred to herein as a deployment server 300 or a deployment agent 300 can be embodied in hardware or software within the deployment server 122. The deployment subsystem 300 can receive information regarding the configuration from the NAS 118, In some embodiments, the poller daemon 302 can populate the snapshot database, and specifically, can populate the snapshot database with information gathered and/or generated from the polling of devices in the computing network. In some embodiments, the poller daemon 302 can, through polling, determine a configuration for the computing network 102 and/or for one or several devices in the computing network, can associate the configuration with a snapshot ID, and can populate the snapshot database within information regarding this configuration. In some embodiments, this polling can be repeatedly performed to enable periodic updates of the snapshot database.

The flight check subsystem 304 can be embodied in hardware or software within the deployment server 122. The flight check subsystem 304 can ascertain a state of the computing network 102 and/or of one or several devices in the computing network 102. This can include, for example, determining if the computing network 102 is functioning and/or determining if each of some or all of the devices in the computing network 102 is functioning. The flight check subsystem 304 can further update the snapshot database with this state information.

The rollback subsystem 306 can be embodied in hardware or software within the deployment server 122. The rollback subsystem can be configured to enable system wide and/or targeted rollback from one configuration to a previous configuration. In some embodiments, this rollback can be based on the functionality of the computing network 102 and/or of one or several devices in the computing network 102. In one embodiment, for example, a device can be identified as having a "failed" state. The rollback subsystem 306 can identify a previous configuration last identified as having an "ok" state. In some embodiments, this previous configuration can be a most recent previous configuration identified as having an "ok" state. The rollback subsystem 306 can apply this previous configuration to the device identified as having the "failed" state. In some embodiments, a similar rollback can be performed for the entire computing network 102 when the computing network 102 is identified as having a "failed" state and/or when more than a threshold number of devices within the computing network 102 are identified as having a "failed" state.

The deployment database 308 can be a subset of the storage 124 and/or can be distinct from the storage 124. In some embodiments, the deployment database 308 can include one or several databases or tables containing information used or generated by any of subsystems 300, 302, 304, 306. In some embodiments, for example, the deployment database 308 can include the inventory database and/or the snapshot database.

Figure 4:
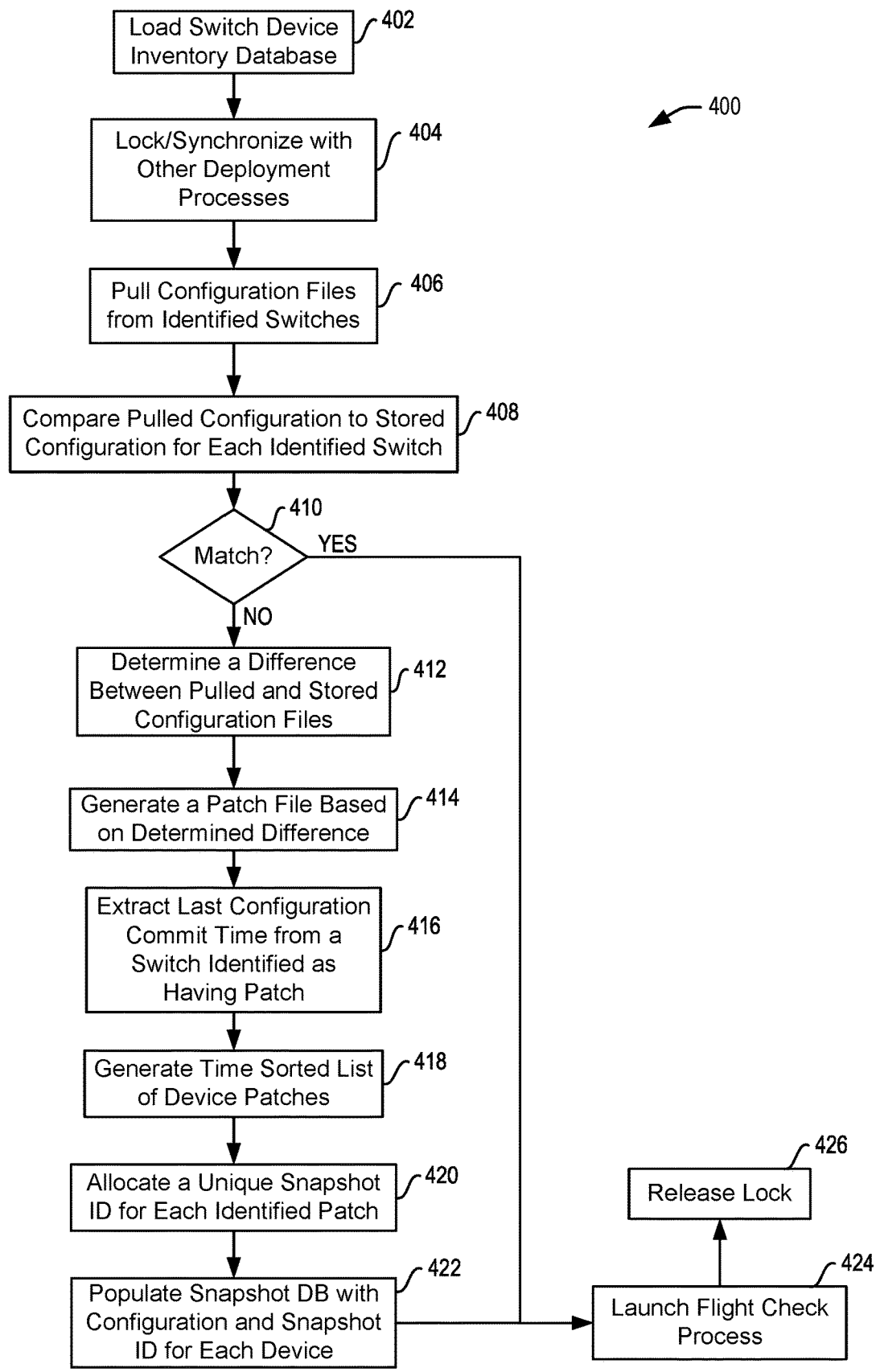
FIG. 4 is a flowchart illustrating one embodiment of a process for polling devices.

FIG. 4 is a flowchart illustrating one embodiment of a process 400 for polling devices. The process 400 can be performed by server 116, and specifically can be wholly or partially performed by poller daemon subsystem 302. The process 400 begins at block 402, wherein the inventory database is loaded, retrieved, and/or received. In some embodiments, the inventory database, also referred to herein as the switch device inventory database, can be received and/or retrieved by the poller daemon 302 from the inventory database, which can be within the deployment database 308. In some embodiments, the receiving and/or retrieving of the inventory database can include the identifying of devices in the computing network 102, and specifically identifying device in the computing network 102 for polling. In some embodiments, all devices in the computing network 102 can be polled by the poller daemon 302, and thus retrieving information from the inventory database identifying the devices in the computing network 102 can simultaneously identify the device in the computing network 102 to be polled by the polling daemon 302.

At block 404, the performing of the following steps of process 400 can be synchronized with other deployment processes. In some embodiments, this can include locking one or several other deployment processes such that when the following steps of process 400 are being performed, other deployment processes are terminated, paused, and/or interrupted. In some embodiments, this can include waiting to perform the following steps of process 400 until one or several other deployment processes that have already started are completed.

At block 406 current configuration files are pulled and/or received from the devices identified in block 402. In some embodiments, this can include the poller daemon 302 generating and sending a communication to each of the identified devices requesting the return of current configuration files. These current configuration files can be provided to, and received by the poller daemon 302.

At block 408, these current configuration files can be compared to stored configuration files, also referred to as base configuration files. In some embodiments, this can be performed for each device identified in block 402 such that, for example, each device's current configuration file is compared to that devices stored configuration file. This comparison determines whether, and to what extent, the current configuration file on a device matches the stored configuration file for that device, in other words, the extent to which the actual configuration of the device matches the expected configuration of that device. In some embodiments, the comparison of block 408 can include the receiving of these base configuration files for the devices identified in block 402. These base configuration files can be, for example, received and/or retrieved from the storage 124.

At decision step 410, it is determined if the base configuration file of a device matches the current configuration file of that device. This determination is made for each of the devices identified in block 402. Thus, for a set of devices, the process 400 may perform different steps for different ones of the devices in the set of devices. If it is determined that the base configuration file does not match the current configuration file of a device, then the process 400 proceeds to block 412, wherein a difference, also referred to as a discrepancy, is determined. In some embodiments, this discrepancy can comprise the difference between the current configuration file and the base configuration file. This difference can, for example, comprise one or several lines of code. At block 414, a patch file for a device is generated based on the determined discrepancy of that device. In some embodiments, this patch file can comprise organizing and/or formatting the discrepancy to thereby create the patch file.

At block 416, the last configuration commit time is extracted for the device for which the patch file was created. In some embodiments, the last configuration commit time of a device can identify a most recent update to the configuration of that device. Thus, the last configuration commit time of a device can comprise the most recent time that the configuration of that device was changed and/or updated.

At block 418, generated patch files can be placed in a time sorted list. In some embodiments, this can be a time sorted list for each device and/or for all devices in the computing network 102. In some embodiments, this can include generating a time sorted list of patch files according to the last configuration commit time associated with each of the patch files. At block 420 a unique snapshot identifier, also referred to herein as a snapshot identifier or a snapshot ID, is allocated. In some embodiments, a unique snapshot ID is allocated for each patch file generated in block 414 and/or for each identified patch. In some embodiments, this snapshot ID can be associated with the last configuration commit time. In some embodiments, the snapshot identification number can be allocated according to the time sorted list of patch files.

At block 422, the snapshot database is populated with the configuration and snapshot ID for each device identified in block 402 and for which a discrepancy was determined. In some embodiments, this can include populating the snapshot database with, for example, the snapshot ID for a device, the timestamp corresponds to the last configuration commit time for that device, a location of the base configuration file for that device, and a location of the patch file for that device.

At block 424, the flight check process can be launched. In some embodiments, the flight check process can gather state information, or in other words, determine a state for the devices identified in block 402 and/or for the computing network 102. In some embodiments, this state information can identify the state of single devices in the computing network 102, and in some embodiments, this state information can identify a state of a set of devices in aggregate, such as, for example, a state of the set of devices forming the computing network 102 in aggregate. Thus, determining the state for the computing network can include determining the state of each device of the set of devices identified in block 402, and determining the state of the set of devices identified in block 402 in aggregate.

This state information, which can, for example, identify a state of the device subsequent to the last configuration commit time, can be received and the snapshot database can be updated to include this state information such that this state information is associated with the corresponding snapshot ID. At block 426, the lock on other deployment processes can be released.

Figure 5:
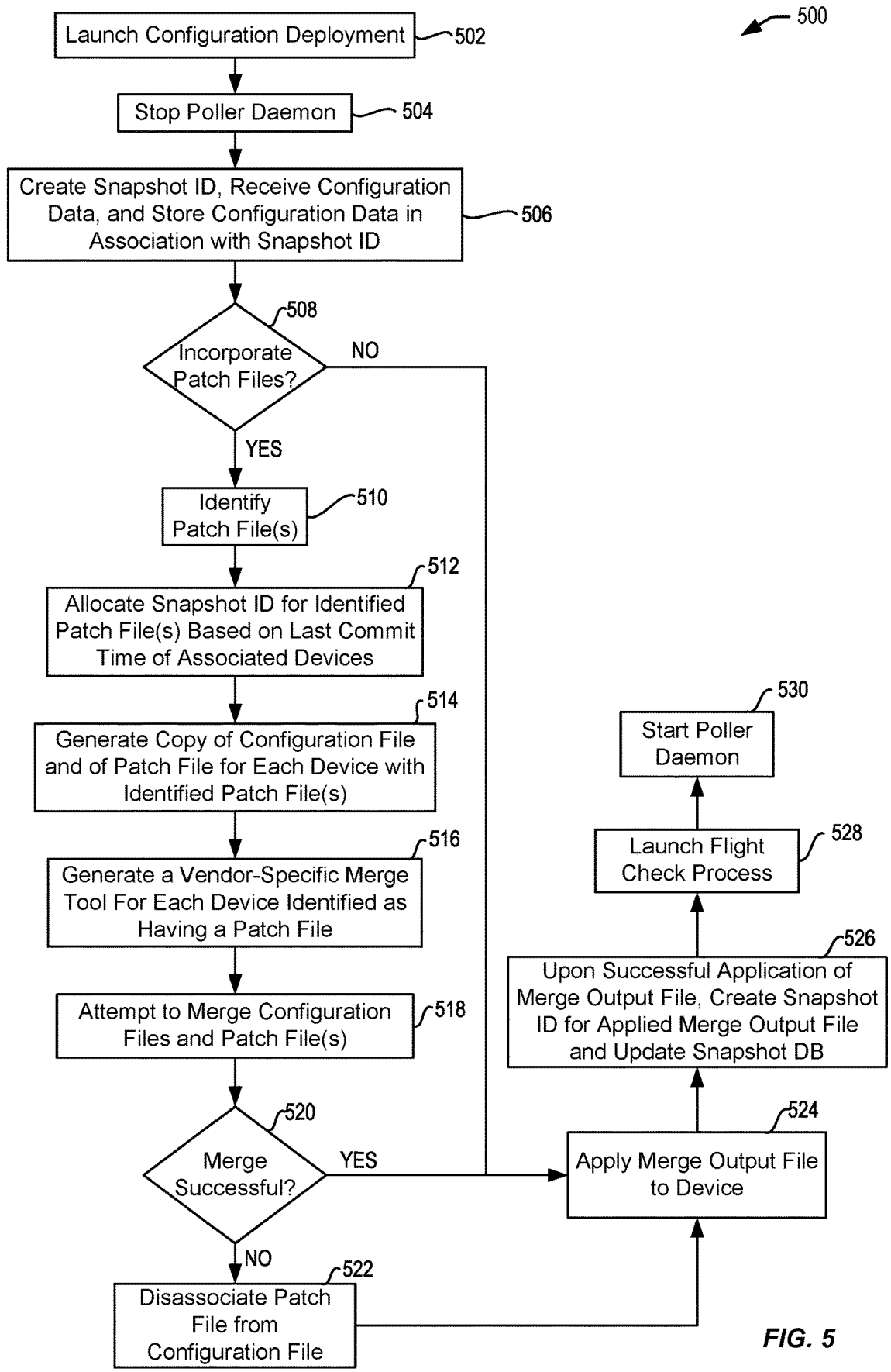
FIG. 5 is a flowchart illustrating one embodiment of a process for configuration deployment.

FIG. 5 is a flowchart illustrating one embodiment of a process 500 for configuration deployment. The process can be performed by server 116. The process 500 begins at block 502, wherein configuration deployment is launched. In some embodiments, this can include the configuration builder subsystem 200 building a new configuration including at least one new configuration file for at least one device in the set of devices forming at least a portion of the computing network 102, and providing that new configuration to the configuration stores subsystem 202. The configuration stores subsystem 202 can launch configuration deployment via, for example, a request such as a HTTP Post request.

At block 504, operation of the poller daemon 302 is stopped. In some embodiments, this can include stopping, for example, process 400. In some embodiments, stopping operation of the poller daemon 302 can include allowing the poller daemon 302 to conclude some or all of its polling, and then stopping further polling. This can include, waiting until the poller daemon releases its lock, such as indicated in block 426 of FIG. 4.

At block 506, a snapshot identifier is created, configuration data such as, for example, new configuration files are received, and the configuration data is stored in association with the snapshot identifier. In some embodiments, this configuration data can be stored in the snapshot database. At decision state 508, it is determined whether to incorporate patch files into any, some, or all of the new configuration files. Thus, in some embodiments, it can be determined whether to incorporate patch files into at least one new configuration file. In some embodiments, this decision can be a single decision for all configuration files of the configuration deployment, and in some embodiments, this decision can be made for each configuration file in the configuration deployment. In some embodiments, this decision can be made based on information that can be, for example, received in the request to launch the configuration, and specifically contained in the HTTP Post request.

If it is determined to incorporate patch files, then the process 500 proceeds to block 510, wherein relevant patch files are identified. In some embodiments, these patch files can be identified based on information contained in the snapshot database, and specifically, information identifying previous configurations of devices and any associated patch files.

In some embodiments, patch files can be identified via polling of the devices that are part of the configuration launch. In some embodiments, this can include polling each of the devices for a last committed timestamp. This last committed timestamp can be received from each of the polled devices, and each polled device's last committed timestamp can be compared to the latest snapshot ID timestamp in the snapshot database of that device. If the last committed timestamp received from a device is more recent that the most recent snapshot ID timestamp of that device, then a new patch file is created for that device. In some embodiments, this new patch file can be created as described in process 400 of FIG. 4, and specifically as described in steps 406 through 422 of FIG. 4.

If it is determined that the last committed timestamp received from the device matches the latest snapshot ID timestamp of that device in the snapshot database, the patch file associated with that latest snapshot ID timestamp can be identified and retrieved.

At block 512 a new snapshot ID is allocated for each of the identified patch files based on the last commit time of the associated device. In some embodiments, this can include the creation of a new snapshot ID for each of the identified patch files. Each of these snapshot IDs can be created based on the last commit time of the device associated with the identified patch for which the snapshot ID is created.

At block 514, for each device, a copy of the new configuration file and of any identified patch file for that device is created. At block 516, a vendor specific-merge tool is generated and/or identified for each device. In some embodiments, this can include, identifying a device, identifying the vendor of the device, identifying a vendor-specific merge tool for that device, and retrieving the vendor specific merge tool. In some embodiments, a vendor specific merge tool can be generated and/or identified and retrieved for all devices and/or for all devices having an associated patch file.

At block 518, for each device having an associated patch file, the vendor-specific merge tool is used to attempt to merge the new configuration file and the patch file associated with that device. In some embodiments, this can include merging the patch file into the new configuration file, which can include inserting the code of the patch file into code of the new configuration file. If the vendor-specific merge tool is able to merge the new configuration file and patch file(s) of a device, in other words, when the attempt to merge the new configuration file and patch file(s) of the device is successful, then the vendor-specific merge tool generates, forms, and/or outputs a merge output file comprising the merged new configuration file(s) and any patch files associated with that device. In some embodiments, this can include the formation of a merge output file for at least one device. In embodiments in which the vendor-specific merge tool is unable to merge the new configuration file and patch file(s) of a device, in other words, when the attempt to merge the new configuration file and patch file(s) of the device is unsuccessful, then the merge output comprises the new configuration file(s) of a device.

At decision step 520, it is determined if the attempted merge was successful. If it is determined that the merge was unsuccessful, then the process 500 proceeds to block 522, wherein the patch file of the unsuccessful merge is disassociated with the new configuration file of the unsuccessful merge.

Returning again to decision step 520, if it is determined that the merge is successful, or after block 522, the process 500 proceeds to block 524, wherein the merge output file is applied. In some embodiments, the merge output file is applied to the device with which the new configuration file(s) and/or the patch file(s) in the merge output are associated. In some embodiment's, this can include applying the merge output file to the at least one device in the set of devices forming at least the portion of the computing network 102.

At block 526, an upon successful application of the merge output file to its associated device, a new snapshot ID is created. This new snapshot ID can be associated with and/or allocated to the merge output file upon successful application of the merge output file to its device. In some embodiments, this snapshot ID can be further associated with information relating to the device, such as, for example, the device name, the vendor, the model, the location of the merge output file and/or the location of each of the new configuration file and the patch file that were incorporated into the merge output file, and a timestamp. In some embodiments, this timestamp indicates the time at which the merge output file was successfully applied to its associated device.

In some embodiments, the snapshot database can be updated to include this new snapshot ID and its associated information, including the location for the merge output file and/or the location of its constituent files.

At block 528, the flight check process can be launched. In some embodiments, the flight check process can gather state information, or in other words, determine a state for the devices in the configuration deployment. In some embodiments, this state information can identify the state of single devices in the computing network 102, and in some embodiments, this state information can identify a state of a set of devices in aggregate, such as, for example, a state of the set of devices forming the computing network 102 in aggregate. Thus, determining the state for the computing network can include determining the state of each device of the set of devices identified in block 402, and determining the state of the set of devices identified in block 402 in aggregate.

This state information, which can, for example, identify a state of the device subsequent to the last configuration commit time, can be received and the snapshot database can be updated to include this state information such that this state information is associated with the corresponding snapshot ID. At block 530, the poller daemon 302 is restarted.

Figure 6:
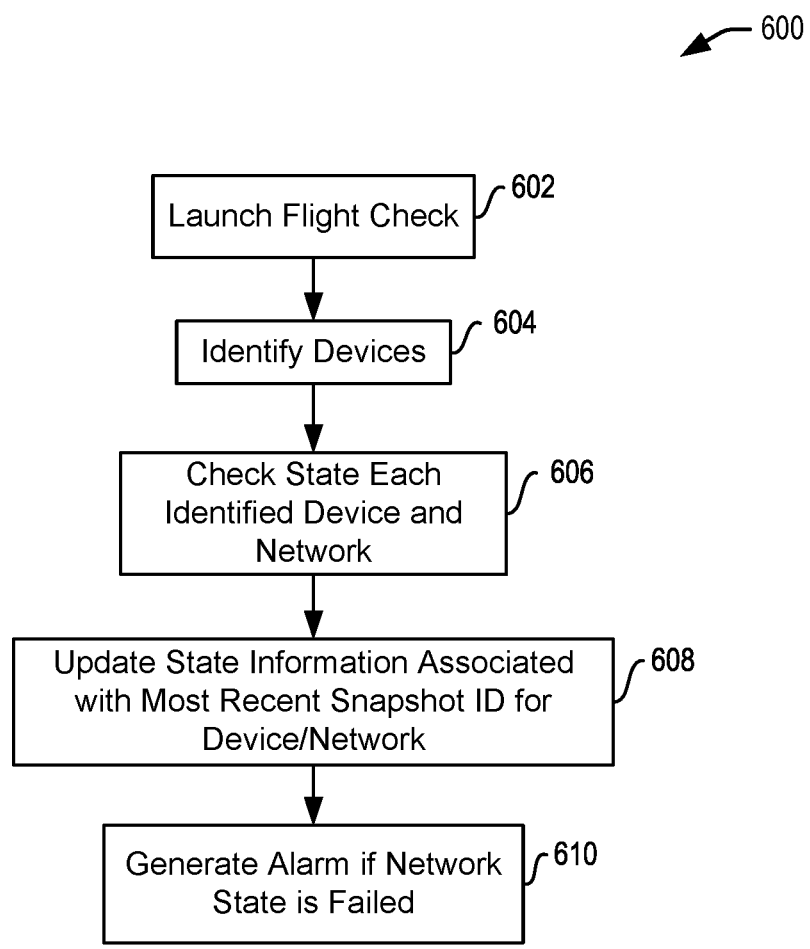
FIG. 6 is a flowchart illustrating one embodiment of a process for assessing a state of a computing network and/or of devices in the computing network.

FIG. 6 is a flowchart illustrating one embodiment of a process 600 for assessing a state of the computing network 102 and/or of devices in the computing network 102. This process 600, also referred to as the flight check process, can be performed by the server 116, and specifically by the deployment server 122, and more specifically by the flight check subsystem 304. The process 600 begins at block 602, wherein the flight check is launched. At block 604, devices to be evaluated by the flight check are identified. In some embodiments, these devices can include some or all of the devices in the computing network 102.

At block 606, the state of each of the identified devices is evaluated, and/or the state of the computing network is evaluated. In some embodiments, this can include determining if: BGP neighbors are properly established; interface states are up; chassis state is fine; BFD sessions are established; cluster state is up if a device is in cluster mode; or the like. If a device is not functioning, then the device state can be identified as failed. In some embodiments, a device is not functioning if the device cannot send and/or receive traffic and/or cannot perform its intended functions. In some embodiments, a device is not functioning if the device fails one of the above identified checks, namely, if: the BGP neighbors are not properly established; interface states are not up; chassis state is not fine; BFD sessions are not established; cluster state is down if the device is in cluster mode; and/or the like.

At block 608, state information associated with the most recent snapshot ID for the checked device and/or for the checked computing network 102 is updated. In some embodiments, this can include populating the portion of the snapshot database associated with both the device or computing network 102 and state with the state information for the checked device and/or checked computing network 102. At block 610, an alarm can be generated and/or triggered if the state of the computing network 102 and/or a state of a group of devices is failed.

Figure 7:
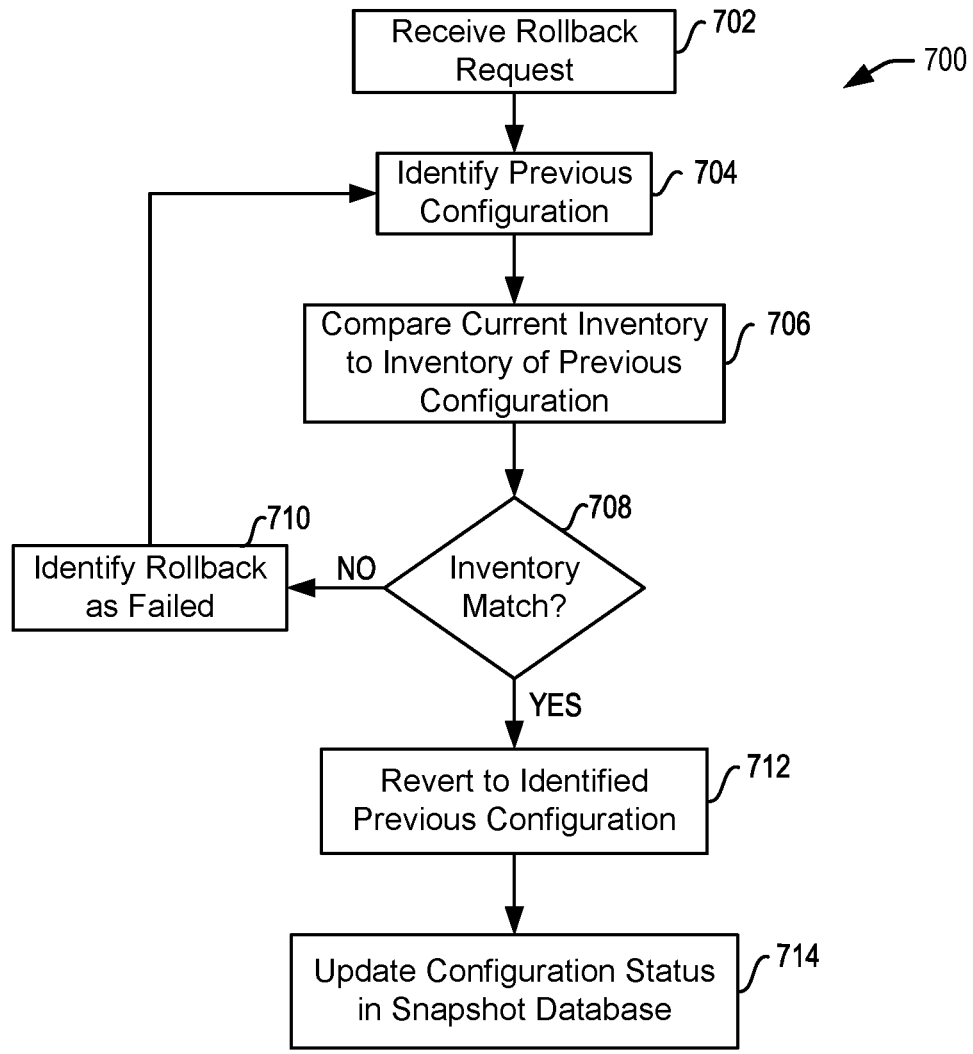
FIG. 7 is a flowchart illustrating one embodiment of a process for configuration rollback.

FIG. 7 is a flowchart illustrating one embodiment of a process 700 for configuration rollback. The process 700 can be performed by the server 116, and specifically by the deployment server 122, and more specifically by the rollback subsystem 306 The process 700 begins at block 702, wherein a rollback request is received. At block 704, one or several previous configurations are identified for the one or several devices for which rollback is requested and/or for the computing network 102 for which rollback is requested. In some embodiments, these previous configurations can be identified in the snapshot database as one or several currently inactive configurations. In some embodiments, one or several previous configurations associated with an OK and/or functioning state can be identified based off of information contained in the snapshot database.

At block 706 the current inventory of devices is compared to the inventory associated with the identified previous configurations. In some embodiments, this can include comparing the devices to be impacted by the requested rollback to devices included in the identified previous configurations. For example, a device cannot be rolled back to a previous configuration that did not exist for the device. In some embodiments in which the rollback is for the entire computing network 102, the inventory of the computing network 102 can be retrieved from the inventory database. In other words, the devices and the topology of devices in the computing network 102 can be retrieved from the inventory database. The devices and the device topology of the computing network 102 can be compared to the devices and topology of the computing network of the identified previous configurations.

At decision step 708, it is determined if there is an inventory match. In other words, it is determined if the devices and topology of devices to be affected by the rollback are included in the identified previous configurations. If it is determined that there is not an inventory match, either because the computing network 102 includes devices not included in the previous configuration and/or because the topology of the computing network 102 does not match the topology associated with the previous configurations, then the process 700 proceeds to block 710 and the rollback is identified as failed.

Alternatively, if it is determined that there is an inventory match, then the process 700 proceeds to block 712, and a previous configuration is selected. In some embodiments, this selected previous configuration can be the most recent previous configuration having an ok state. This selected previous configuration can then be applied to the device(s) included in the rollback request. At bock 714, a configuration status is updated in the snapshot database. In some embodiments, this can include changing the status from the previous current configuration from active to inactive, and changing the status of the selected previous configuration from inactive to active.

Exemplary Implementation

Figure 8:
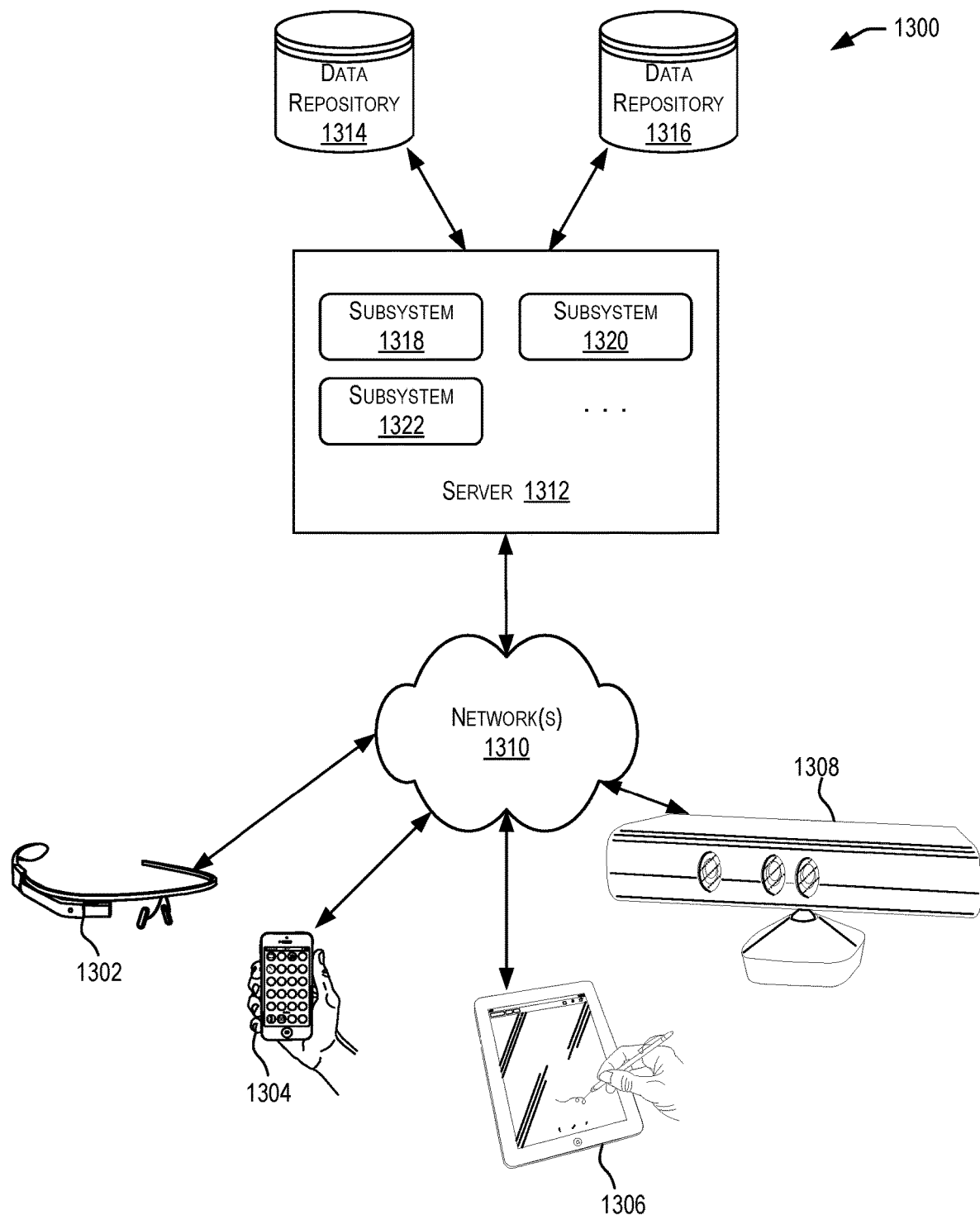
FIG. 8 depicts a simplified diagram of a distributed system for implementing an embodiment.

FIG. 8 depicts a simplified diagram of a distributed system 1300 for implementing an embodiment. In the illustrated embodiment, distributed system 1300 includes one or more client computing devices 1302, 1304, 1306, and 1308, coupled to a server 1312 via one or more communication networks 1310. Clients computing devices 1302, 1304, 1306, and 1308 may be configured to execute one or more applications.

In various embodiments, server 1312 may be adapted to run one or more services or software applications that enable the processing described in this disclosure.

In certain embodiments, server 1312 may also provide other services or software applications that can include non-virtual and virtual environments. In some embodiments, these services may be offered as web-based or cloud services, such as under a Software as a Service (SaaS) model to the users of client computing devices 1302, 1304, 1306, and/or 1308. Users operating client computing devices 1302, 1304, 1306, and/or 1308 may in turn utilize one or more client applications to interact with server 1312 to utilize the services provided by these components.

In the configuration depicted in FIG. 8, server 1312 may include one or more components 1318, 1320 and 1322 that implement the functions performed by server 1312. These components may include software components that may be executed by one or more processors, hardware components, or combinations thereof. It should be appreciated that various different system configurations are possible, which may be different from distributed system 1300. The embodiment shown in FIG. 8 is thus one example of a distributed system for implementing an embodiment system and is not intended to be limiting.

Users may use client computing devices 1302, 1304, 1306, and/or 1308 to interact with server 1312 in accordance with the teachings of this disclosure. A client device may provide an interface that enables a user of the client device to interact with the client device. The client device may also output information to the user via this interface. Although FIG. 13 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1310 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1310 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics Engineers (IEEE) 1002.11 suite of protocols, Bluetooth®, and/or any other wireless protocol), and/or any combination of these and/or other networks.

Server 1312 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1312 can include one or more virtual machines running virtual operating systems, or other computing architectures involving virtualization such as one or more flexible pools of logical storage devices that can be virtualized to maintain virtual storage devices for the server. In various embodiments, server 1312 may be adapted to run one or more services or software applications that provide the functionality described in the foregoing disclosure.

The computing systems in server 1312 may run one or more operating systems including any of those discussed above, as well as any commercially available server operating system. Server 1312 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1312 may include one or more applications to analyze and consolidate data feeds and/or event updates received from users of client computing devices 1302, 1304, 1306, and 1308. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 1312 may also include one or more applications to display the data feeds and/or real-time events via one or more display devices of client computing devices 1302, 1304, 1306, and 1308.

Distributed system 1300 may also include one or more data repositories 1314, 1316. These data repositories may be used to store data and other information in certain embodiments. For example, one or more of the data repositories 1314, 1316 may be used to store data or information generated by the processing described herein and/or data or information used for the processing described herein. Data repositories 1314, 1316 may reside in a variety of locations. For example, a data repository used by server 1312 may be local to server 1312 or may be remote from server 1312 and in communication with server 1312 via a network-based or dedicated connection. Data repositories 1314, 1316 may be of different types. In certain embodiments, a data repository used by server 1312 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 1314, 1316 may also be used by applications to store application data. The data repositories used by applications may be of different types such as, for example, a key-value store repository, an object store repository, or a general storage repository supported by a file system.

Figure 9:
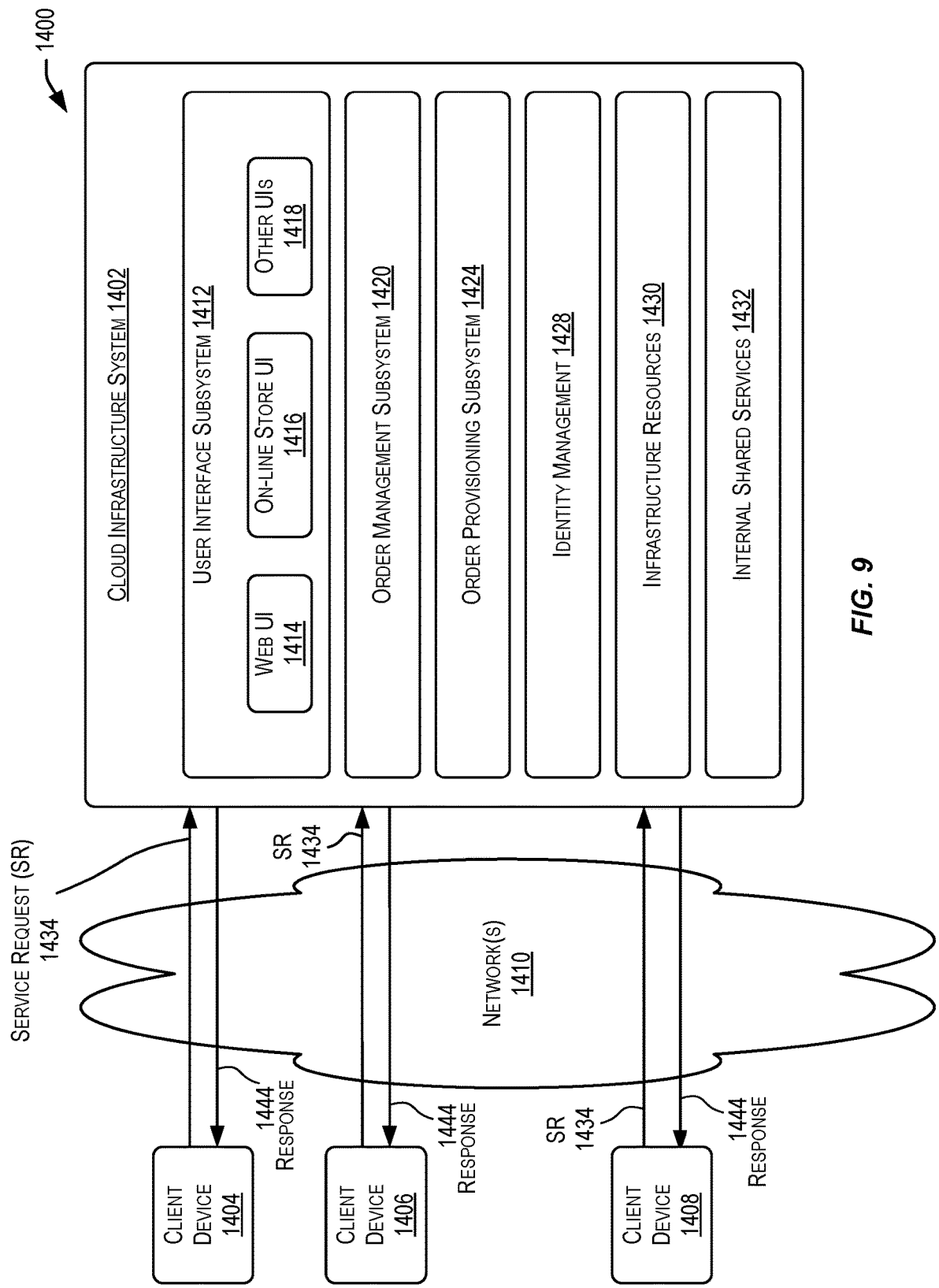
FIG. 9 is a simplified block diagram of a cloud-based system environment offering cloud services, in accordance with certain embodiments.

In certain embodiments, the functionalities described in this disclosure may be offered as services via a cloud environment. FIG. 9 is a simplified block diagram of a cloud-based system environment in which functionalities described herein may be offered as cloud services, in accordance with certain embodiments. In the embodiment depicted in FIG. 9, cloud infrastructure system 1402 may provide one or more cloud services that may be requested by users using one or more client computing devices 1404, 1406, and 1408. Cloud infrastructure system 1402 may comprise one or more computers and/or servers that may include those described above for server 1312. The computers in cloud infrastructure system 1402 may be organized as general-purpose computers, specialized server computers, server farms, server clusters, or any other appropriate arrangement and/or combination.

Network(s) 1410 may facilitate communication and exchange of data between clients 1404, 1406, and 1408 and cloud infrastructure system 1402. Network(s) 1410 may include one or more networks. The networks may be of the same or different types. Network(s) 1410 may support one or more communication protocols, including wired and/or wireless protocols, for facilitating the communications.

The embodiment depicted in FIG. 9 is only one example of a cloud infrastructure system and is not intended to be limiting. It should be appreciated that, in some other embodiments, cloud infrastructure system 1402 may have more or fewer components than those depicted in FIG. 9, may combine two or more components, or may have a different configuration or arrangement of components. For example, although FIG. 9 depicts three client computing devices, any number of client computing devices may be supported in alternative embodiments.

The term cloud service is generally used to refer to a service that is made available to users on demand and via a communication network such as the Internet by systems (e.g., cloud infrastructure system 1402) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 1402 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1402 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1402. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1402. Cloud infrastructure system 1402 then performs processing to provide the services requested in the customer's subscription order. Cloud infrastructure system 1402 may be configured to provide one or even multiple cloud services.

Cloud infrastructure system 1402 may provide the cloud services via different deployment models. In a public cloud model, cloud infrastructure system 1402 may be owned by a third-party cloud services provider and the cloud services are offered to any general public customer, where the customer can be an individual or an enterprise. In certain other embodiments, under a private cloud model, cloud infrastructure system 1402 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 1402 and the services provided may be shared by several organizations in a related community. Various other models such as hybrids of the above-mentioned models may also be used.

Client computing devices 1404, 1406, and 1408 may be of different types (such as devices 1302, 1304, 1306, and 1308 depicted in FIG. 8) and may be capable of operating one or more client applications. A user may use a client device to interact with cloud infrastructure system 1402, such as to request a service provided by cloud infrastructure system 1402.

In some embodiments, the processing performed by cloud infrastructure system 1402 may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 9, cloud infrastructure system 1402 may include infrastructure resources 1430 that are utilized for facilitating the provision of various cloud services offered by cloud infrastructure system 1402. Infrastructure resources 1430 may include, for example, processing resources, storage or memory resources, networking resources, and the like.

In certain embodiments, to facilitate efficient provisioning of these resources for supporting the various cloud services provided by cloud infrastructure system 1402 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1402 may itself internally use services 1432 that are shared by different components of cloud infrastructure system 1402 and which facilitate the provisioning of services by cloud infrastructure system 1402. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1402 may comprise multiple subsystems. These subsystems may be implemented in software, or hardware, or combinations thereof. As depicted in FIG. 9, the subsystems may include a user interface subsystem 1412 that enables users or customers of cloud infrastructure system 1402 to interact with cloud infrastructure system 1402. User interface subsystem 1412 may include various different interfaces such as a web interface 1414, an online store interface 1416 where cloud services provided by cloud infrastructure system 1402 are advertised and are purchasable by a consumer, and other interfaces 1418. For example, a customer may, using a client device, request (service request 1434) one or more services provided by cloud infrastructure system 1402 using one or more of interfaces 1414, 1416, and 1418. For example, a customer may access the online store, browse cloud services offered by cloud infrastructure system 1402, and place a subscription order for one or more services offered by cloud infrastructure system 1402 that the customer wishes to subscribe to. The service request may include information identifying the customer and one or more services that the customer desires to subscribe to.

In certain embodiments, such as the embodiment depicted in FIG. 9, cloud infrastructure system 1402 may comprise an order management subsystem (OMS) 1420 that is configured to process the new order. As part of this processing, OMS 1420 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1420 may then invoke the order provisioning subsystem (OPS) 1424 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1424 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 1402 may send a response or notification 1444 to the requesting customer to indicate when the requested service is now ready for use. In some instances, information (e.g., a link) may be sent to the customer that enables the customer to start using and availing the benefits of the requested services.

Cloud infrastructure system 1402 may provide services to multiple customers. For each customer, cloud infrastructure system 1402 is responsible for managing information related to one or more subscription orders received from the customer, maintaining customer data related to the orders, and providing the requested services to the customer. Cloud infrastructure system 1402 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1402 may provide services to multiple customers in parallel. Cloud infrastructure system 1402 may store information for these customers, including possibly proprietary information. In certain embodiments, cloud infrastructure system 1402 comprises an identity management subsystem (IMS) 1428 that is configured to manage customers information and provide the separation of the managed information such that information related to one customer is not accessible by another customer. IMS 1428 may be configured to provide various security-related services such as identity services, such as information access management, authentication and authorization services, services for managing customer identities and roles and related capabilities, and the like.

Figure 10:
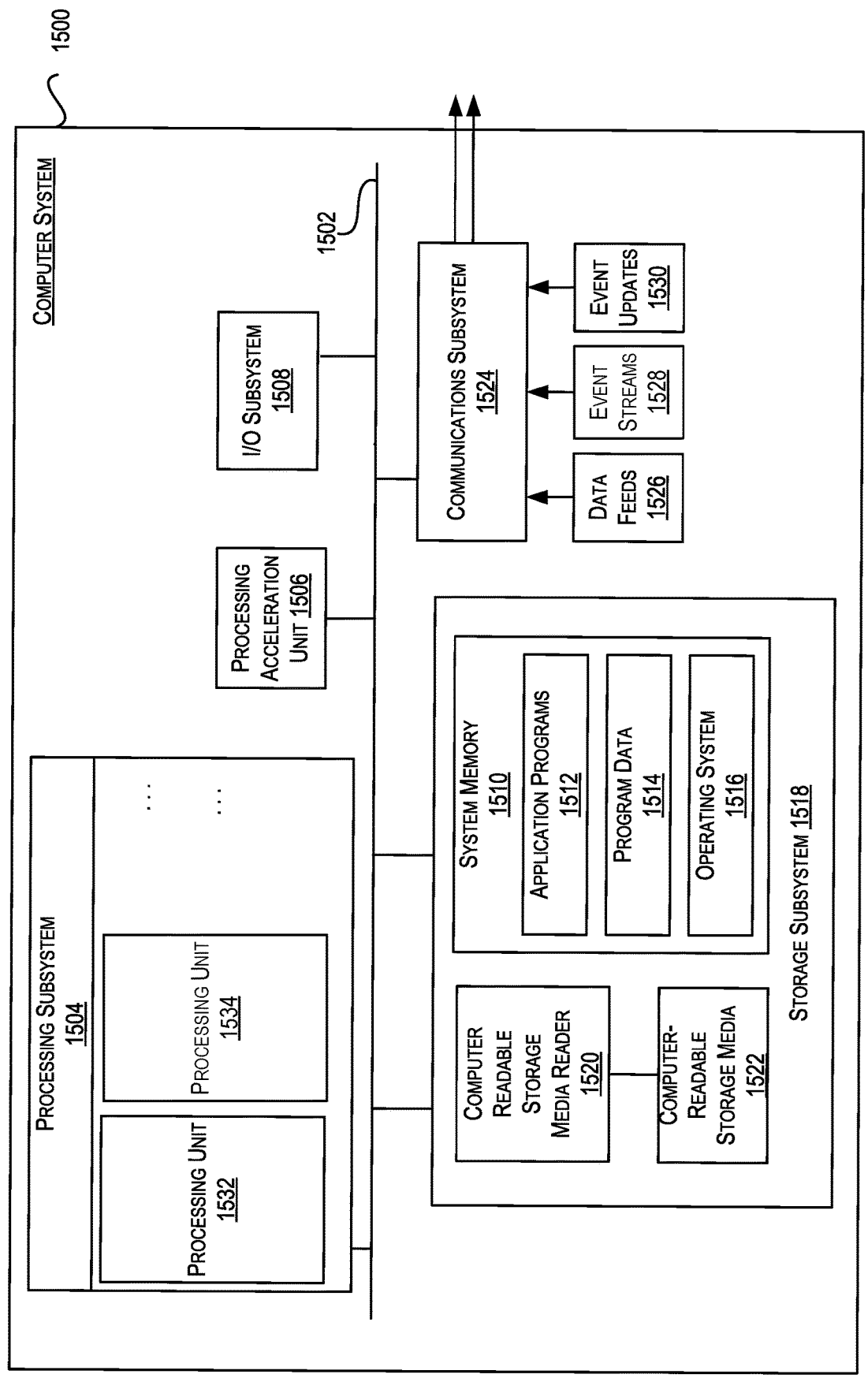
FIG. 10 illustrates an exemplary computer system that may be used to implement certain embodiments.

FIG. 10 illustrates an exemplary computer system 1500 that may be used to implement certain embodiments. For example, in some embodiments, computer system 1500 may be used to implement any of the system and subsystems for performing processing according to the present disclosure. As shown in FIG. 10, computer system 1500 includes various subsystems including a processing subsystem 1504 that communicates with a number of other subsystems via a bus subsystem 1502. These other subsystems may include a processing acceleration unit 1506, an I/O subsystem 1508, a storage subsystem 1518, and a communications subsystem 1524. Storage subsystem 1518 may include non-transitory computer-readable storage media including storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative embodiments of the bus subsystem may utilize multiple buses. Bus subsystem 1502 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1504 controls the operation of computer system 1500 and may comprise one or more processors, application specific integrated circuits (ASICs), or field programmable gate arrays (FPGAs). The processors may include be single core or multicore processors. The processing resources of computer system 1500 can be organized into one or more processing units 1532, 1534, etc. A processing unit may include one or more processors, one or more cores from the same or different processors, a combination of cores and processors, or other combinations of cores and processors. In some embodiments, processing subsystem 1504 can include one or more special purpose co-processors such as graphics processors, digital signal processors (DSPs), or the like. In some embodiments, some or all of the processing units of processing subsystem 1504 can be implemented using customized circuits, such as application specific integrated circuits (ASICs), or field programmable gate arrays (FPGAs).

In some embodiments, the processing units in processing subsystem 1504 can execute instructions stored in system memory 1510 or on computer readable storage media 1522. In various embodiments, the processing units can execute a variety of programs or code instructions and can maintain multiple concurrently executing programs or processes. At any given time, some or all of the program code to be executed can be resident in system memory 1510 and/or on computer-readable storage media 1522 including potentially on one or more storage devices. Through suitable programming, processing subsystem 1504 can provide various functionalities described above. In instances where computer system 1500 is executing one or more virtual machines, one or more processing units may be allocated to each virtual machine.

In certain embodiments, a processing acceleration unit 1506 may optionally be provided for performing customized processing or for off-loading some of the processing performed by processing subsystem 1504 so as to accelerate the overall processing performed by computer system 1500.

I/O subsystem 1508 may include devices and mechanisms for inputting information to computer system 1500 and/or for outputting information from or via computer system 1500. In general, use of the term input device is intended to include all possible types of devices and mechanisms for inputting information to computer system 1500. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1500 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1518 provides a repository or data store for storing information and data that is used by computer system 1500. Storage subsystem 1518 provides a tangible non-transitory computer-readable storage medium for storing the basic programming and data constructs that provide the functionality of some embodiments. Storage subsystem 1518 may store software (e.g., programs, code modules, instructions) that when executed by processing subsystem 1504 provides the functionality described above. The software may be executed by one or more processing units of processing subsystem 1504. Storage subsystem 1518 may also provide a repository for storing data used in accordance with the teachings of this disclosure.

Storage subsystem 1518 may include one or more non-transitory memory devices, including volatile and non-volatile memory devices. As shown in FIG. 10, storage subsystem 1518 includes a system memory 1510 and a computer-readable storage media 1522. System memory 1510 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1500, such as during start-up, may typically be stored in the ROM. The RAM typically contains data and/or program modules that are presently being operated and executed by processing subsystem 1504. In some implementations, system memory 1510 may include multiple different types of memory, such as static random access memory (SRAM), dynamic random access memory (DRAM), and the like.

By way of example, and not limitation, as depicted in FIG. 10, system memory 1510 may load application programs 1512 that are being executed, which may include various applications such as Web browsers, mid-tier applications, relational database management systems (RDBMS), etc., program data 1514, and an operating system 1516. By way of example, operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1522 may store programming and data constructs that provide the functionality of some embodiments. Computer-readable media 1522 may provide storage of computer-readable instructions, data structures, program modules, and other data for computer system 1500. Software (programs, code modules, instructions) that, when executed by processing subsystem 1504 provides the functionality described above, may be stored in storage subsystem 1518. By way of example, computer-readable storage media 1522 may include non-volatile memory such as a hard disk drive, a magnetic disk drive, an optical disk drive such as a CD ROM, DVD, a Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1518 may also include a computer-readable storage media reader 1520 that can further be connected to computer-readable storage media 1522. Reader 1520 may receive and be configured to read data from a memory device such as a disk, a flash drive, etc.

In certain embodiments, computer system 1500 may support virtualization technologies, including but not limited to virtualization of processing and memory resources. For example, computer system 1500 may provide support for executing one or more virtual machines. In certain embodiments, computer system 1500 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1500. Accordingly, multiple operating systems may potentially be run concurrently by computer system 1500.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to establish a communication channel to one or more client devices via the Internet for receiving and sending information from and to the client devices.

Communication subsystem 1524 may support both wired and/or wireless communication protocols. For example, in certain embodiments, communications subsystem 1524 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 1524 can provide wired network connectivity (e.g., Ethernet) in addition to or instead of a wireless interface.

Communication subsystem 1524 can receive and transmit data in various forms. For example, in some embodiments, in addition to other forms, communications subsystem 1524 may receive input communications in the form of structured and/or unstructured data feeds 1526, event streams 1528, event updates 1530, and the like. For example, communications subsystem 1524 may be configured to receive (or send) data feeds 1526 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1524 may be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1524 may also be configured to communicate data from computer system 1500 to other computer systems or networks. The data may be communicated in various different forms such as structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1500 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   receiving with a poller daemon base configuration files for a set of devices forming at least a portion of a computing network;
   pulling with the poller daemon current configuration files from each device of the set of devices forming the at least the portion of the computing network;
   for each device, determining with the poller daemon a discrepancy when a base configuration file of the device and a current configuration file of the device do not match;
   when the discrepancy is determined for a device, generating with the poller daemon a patch file based on the determined discrepancy for that device;
   extracting with the poller daemon a last configuration commit time from that device, the last configuration commit time identifying a most recent update to a configuration of that device;
   allocating with the poller daemon a unique snapshot identifier to the patch file and associated with the last configuration commit time; and
   populating a snapshot database with the unique snapshot identifier, a timestamp corresponding to the last configuration commit time for the device, a state of the device, a location of the base configuration file for the device, and a location of the patch file for the device.

2. The method of claim 1, further comprising receiving a device inventory from an inventory database, the device inventory identifying the set of devices forming at least the portion of the computing network.

3. The method of claim 1, further comprising generating a time sorted list of patch files according to the last configuration commit time associated with each of the patch files, and wherein the unique snapshot identifier is allocated according to the time sorted list of patch files.

4. The method of claim 1, wherein determining the discrepancy for the device comprises comparing the base configuration file and the current configuration file.

5. The method of claim 1, further comprising: launching a flight check process; and determining a state of the computing network.

6. The method of claim 5, wherein determining the state of the computing network comprises: determining the state of each device of the set of devices; and determining the state of the set of devices in aggregate.

7. The method of claim 6, wherein the state of each device populated in the snapshot database is the determined state of that device.

8. The method of claim 6, further comprising triggering an alarm if it is determined that the state of the set of devices in aggregate is failed.

9. The method of claim 1, further comprising: receiving a configuration deployment request; and suspending action by the poller daemon.

10. The method of claim 9, wherein receiving the configuration deployment request comprises receiving at least one new configuration file for at least one device in the set of devices forming at least the portion of the computing network.

11. The method of claim 10, further comprising determining to incorporate any available patch files for the at least one device into the at least one new configuration file.

12. The method of claim 11, further comprising:
   identifying a patch file for the at least one device;
   forming a merge output file for the at least one device; and
   applying the merge output file to the at least one device in the set of devices forming at least the portion of the computing network.

13. The method of claim 12, wherein the merge output file is generated via attempting to merge the identified patch file and the at least one new configuration file.

14. The method of claim 13, wherein the merge output file comprises the at least one new configuration file and the identified patch file for the at least one device when attempting to merge the identified patch file and the at least one new configuration file is successful.

15. The method of claim 13, further comprising disassociating the patch file from the configuration file when attempting to merge the identified patch file and the at least one new configuration file is unsuccessful.

16. The method of claim 12, further comprising:
associating a new snapshot identifier with the merge output file upon successful application of the merge output file to the at least one device; and
updating the snapshot database with the new snapshot identifier and a location for the merge output file.

17. A non-transitory computer-readable storage medium storing a plurality of instructions executable by one or more processors, the plurality of instructions when executed by the one or more processors cause the one or more processors to:
receive base configuration files for a set of devices forming at least a portion of a computing network;
pull current configuration files from each device of the set of devices forming the at least the portion of the computing network;
for each device, determine a discrepancy when a base configuration file of the device and a current configuration file of the device do not match;
when the discrepancy is determined for a device, generate a patch file based on the determined discrepancy for that device;
extract a last configuration commit time from that device, the last configuration commit time identifying a most recent update to a configuration of that device;
allocate a unique snapshot identifier to the patch file and associated with the last configuration commit time; and
populate a snapshot database with the unique snapshot identifier, a timestamp corresponding to the last configuration commit time for the device, a state of the device, a location of the base configuration file for the device, and a location of the patch file for the device.

18. The non-transitory computer-readable storage medium of claim 17, the non-transitory computer-readable storage medium storing a plurality of instructions executable by one or more processors, the plurality of instructions when executed by the one or more processors cause the one or more processors to further:
receive a configuration deployment request, wherein receiving the configuration deployment request comprises receiving at least one new configuration file for at least one device in the set of devices forming at least the portion of the computing network; and
suspend action by the poller daemon.

19. A system comprising:
a memory comprising a snapshot database comprising information relating to a plurality of configurations, each of the plurality of configurations associated with a snapshot identifier; and
a processor configured to:
receive base configuration files for a set of devices forming at least a portion of a computing network;
pull current configuration files from each device of the set of devices forming the at least the portion of the computing network;
for each device, determine a discrepancy when a base configuration file of the device and a current configuration file of the device do not match;
when the discrepancy is determined for a device, generate a patch file based on the determined discrepancy for that device;
extract a last configuration commit time from that device, the last configuration commit time identifying a most recent update to a configuration of that device;
allocate a unique snapshot identifier to the patch file and associated with the last configuration commit time; and
populate the snapshot database with the unique snapshot identifier, a timestamp corresponding to the last configuration commit time for the device, a state of the device, a location of the base configuration file for the device, and a location of the patch file for the device.

20. The system of claim 19, wherein the processor is further configured to:
receive a configuration deployment request, wherein receiving the configuration deployment request comprises receiving at least one new configuration file for at least one device in the set of devices forming at least the portion of the computing network;
determine to incorporate any available patch files for the at least one device into the at least one new configuration file;
identify a patch file for the at least one device;
form a merge output file for the at least one device; and
apply the merge output file to the at least one device in the set of devices forming at least the portion of the computing network.

* * * * *